United States Patent [19]

Goto

[11] Patent Number: 5,737,310

[45] Date of Patent: Apr. 7, 1998

[54] SYNCHRONOUS RING NETWORK SYSTEM

[75] Inventor: Masataka Goto, Tokyo, Japan

[73] Assignee: NEC Corporation, Tokyo, Japan

[21] Appl. No.: 648,999

[22] Filed: May 17, 1996

[30] Foreign Application Priority Data

May 17, 1995 [JP] Japan .................................. 7-117581

[51] Int. Cl.⁶ .................................................. H04J 3/14
[52] U.S. Cl. ........................................ 370/222; 370/541
[58] Field of Search ................................ 370/216, 217,
370/218, 219, 220, 221, 222, 223, 224,
225, 226, 227, 228, 241, 242, 243, 248,
252, 376, 460, 406, 400, 505, 535, 536,
537, 538, 539, 540, 541, 542, 543, 544

[56] References Cited

U.S. PATENT DOCUMENTS

| | | | |
|---|---|---|---|
| 5,168,494 | 12/1992 | Mueller | 370/539 |
| 5,267,239 | 11/1993 | Pospischil et al. | 370/376 |
| 5,331,360 | 7/1994 | Fujita et al. | 370/351 |
| 5,442,620 | 8/1995 | Kremer | 370/224 |
| 5,465,252 | 11/1995 | Müller | 370/535 |
| 5,528,580 | 6/1996 | Lee et al. | 370/536 |
| 5,583,855 | 12/1996 | Ball | 370/376 |
| 5,600,648 | 2/1997 | Furata | 370/280 |

*Primary Examiner*—Wellington Chin
*Assistant Examiner*—Huy D. Vu
*Attorney, Agent, or Firm*—Sughrue, Mion, Zinn, Macpeak & Seas, PLLC

[57] ABSTRACT

Disclosed is a synchronous ring network system, which has a plurality of nodes, each of the nodes has: switching means for conducting a protection switching processing in response to a trouble; higher-order path misconnection search means for searching a misconnection of the AU signal caused by the switching processing; means for instructing the higher-order path squelch means to squelch an AU signal from the result of the higher-order path misconnection searching; lower-order path misconnection search means for searching a misconnection of the TU signal caused by the switching processing; means for instructing the lower-order path squelch means to squelch a TU signal from the result of the lower-order path misconnection searching; means for instructing the release of the higher-order path squelch after squelching by the lower-order path squelch means; and means for instructing the higher-order path overhead processing means to stop the termination as to a predetermined byte of each byte for composing the higher-order path overhead.

6 Claims, 12 Drawing Sheets

FIG. 10A

| K1 BYTE | | K2 BYTE | | |
|---|---|---|---|---|
| BRIDGE REQUEST CODE | DESTINATION NODE ID | SOURSE NODE ID | L/S | STATUS |
| 1 2 3 4 | 5 6 7 8 | 1 2 3 4 | 5 | 6 7 8 |

FIG. 10B

LONG PATH

| SF-R | 2 | 1 | L | IDLE |
|---|---|---|---|---|

SHORT PATH

| SF-R | 2 | 1 | S | FERF |
|---|---|---|---|---|

FIG. 10C

LONG PATH

| SF-R | 2 | 3 | L | IDLE |
|---|---|---|---|---|

SHORT PATH

| SF-R | 2 | 3 | S | FERF |
|---|---|---|---|---|

FIG. 10D

LONG PATH

| SF-R | 2 | 1 | L | BR&SW |
|---|---|---|---|---|

SHORT PATH

| SF-R | 2 | 1 | S | FERF |
|---|---|---|---|---|

FIG. 10E

LONG PATH

| SF-R | 2 | 3 | L | BR&SW |
|---|---|---|---|---|

SHORT PATH

| SF-R | 2 | 3 | S | FERF |
|---|---|---|---|---|

FIG. 11

NODE 1

| AUG No. | WEST | | | | EAST | | |
|---|---|---|---|---|---|---|---|
| | ADD | DROP | TU PATH | | ADD | DROP | TU PATH |
| 1 | 2 | 1 | INCLUDE | | 4 | 1 | INCLUDE |
| --- | | | | | | | |

| TU No. | WEST | | EAST | |
|---|---|---|---|---|
| | ADD | DROP | ADD | DROP |
| 1 | 2 | 1 | 4 | 1 |
| 2 | 3 | 1 | | |
| --- | | | | |

FIG.12

NODE 2

| AUG No. | WEST | | | | EAST | | | |
|---|---|---|---|---|---|---|---|---|
| | ADD | DROP | TU PATH | | ADD | DROP | TU PATH | |
| | | | INC-LUDE | | | | INC-LUDE | |
| 1 | 3 | 2 | | | 1 | 2 | | |
| --- | | | | | | | | |

| TU No. | WEST | | EAST | |
|---|---|---|---|---|
| | ADD | DROP | ADD | DROP |
| 1 | 3 | 2 | 1 | 2 |
| 2 | 3 | 1 | 1 | 3 |
| --- | | | | |

FIG. 13

| TU No. | WEST ADD | WEST DROP | EAST ADD | EAST DROP |
|---|---|---|---|---|
| 1 | 4 | 3 | 2 | 3 |
| 2 |  |  | 1 | 3 |
| ... |  |  |  |  |

NODE 3

| AUG No. | WEST ADD | WEST DROP | WEST TU PATH | EAST ADD | EAST DROP | EAST TU PATH |
|---|---|---|---|---|---|---|
| 1 | 4 | 3 | INCLUDE | 2 | 3 | INCLUDE |
| ... |  |  |  |  |  |  |

FIG. 14

NODE 4

| AUG No. | WEST | | | EAST | | |
|---|---|---|---|---|---|---|
| | ADD | DROP | TU PATH INC-LUDE | ADD | DROP | TU PATH INC-LUDE |
| 1 | 1 | 4 | | 3 | 4 | |
| --- | | | | | | |

| TU No. | WEST | | EAST | |
|---|---|---|---|---|
| | ADD | DROP | ADD | DROP |
| 1 | 1 | 4 | 3 | 4 |
| 2 | | | | |
| --- | | | | |

SYNCHRONOUS RING NETWORK SYSTEM

FIELD OF THE INVENTION

This invention relates to a synchronous ring network system, and more particularly to, a synchronous ring network system in which a plurality of nodes are connected through a synchronous ring network to form a bidirectional line-switched ring(BLSR) system.

BACKGROUND OF THE INVENTION

A conventional synchronous ring network system comprises a plurality of nodes connected through a synchronous ring network, each of the plurality of nodes comprising multiplexing/demultiplexing means in which a TU signal which corresponds to a lower-order path signal is multiplexed to give an AU signal which corresponds to a higher-order path signal and the AU signal is demultiplexed to give the TU signal, higher-order path overhead processing means for conducting a production/termination control of a higher-order path overhead, lower-order path squelch means for squelching the TU signal, and higher-order path squelch means for squelching the AU signal.

However, in preventing misconnection of a TU path when conducting protection switching in the conventional BLSR system for TU access, the misconnection in higher-order path overhead occurs since the AU squelch is released when completing the TU squelch at the termination node where the misconnected TU path is terminated. For example, when J1 byte of a higher-order path overhead is used to perform the path trace function of a higher-order path layer, the misconnection occurred in higher-order path overhead due to the releasing of AU squelch causes the disagreement of the path trace function, thereby failing to save a TU path which can be saved by the insertion of the AIS signal which responds to the disagreement. In addition, when a user uses F2 byte of a user channel, the misconnection of F2 byte occurs to reduce the reliability.

SUMMARY OF THE INVENTION

Accordingly, it is an object of the invention to provide a synchronous ring network system which can prevent the occurrence of misconnection in a higher-order path caused by protection switching and the unnecessary action from the detection of trouble.

According to the invention, a synchronous ring network system, comprises a plurality of nodes connected through a synchronous ring network, each of the plurality of nodes comprising multiplexing/demultiplexing means in which a TU signal which corresponds to a lower-order path signal is multiplexed to give an AU signal which corresponds to a higher-order path signal and the AU signal is demultiplexed to give the TU signal, higher-order path overhead processing means for conducting a production/termination control of a higher-order path overhead, lower-order path squelch means for squelching the TU signal, and higher-order path squelch means for squelching the AU signal, characterized in that each of the plurality of nodes further comprises:

switching means for conducting a protection switching processing in response to a trouble;

higher-order path misconnection search means for searching a misconnection of the AU signal caused by the switching processing;

means for instructing the higher-order path squelch means to squelch an AU signal from the result of the higher-order path misconnection searching;

lower-order path misconnection search means for searching a misconnection of the TU signal caused by the switching processing;

means for instructing the lower-order path squelch means to squelch a TU signal from the result of the lower-order path misconnection searching;

means for instructing the release of the higher-order path squelch after squelching by the lower-order path squelch means; and means for instructing the higher-order path overhead processing means to stop the termination as to a predetermined byte of each byte for composing the higher-order path overhead.

In accordance with the synchronous ring network system of the invention, the occurrence of the misconnection in a higher-order path overhead caused by protection switching and the unnecessary action from the detection of trouble can be prevented since the release of AU squelch is simultaneously conducted with the misconnection avoiding control of higher-order path overhead after completing TU squelch at the termination node where a misconnected TU path is terminated.

Furthermore, since the system can set whether or not each of bytes composing a higher-order path overhead is an object of misconnection avoiding control, the misconnection avoiding control can be applied only to the byte which needs higher-order path overhead misconnection avoiding control.

BRIEF DESCRIPTION OF THE DRAWINGS

The invention will be explained in more detail in conjunction with the appended drawings, wherein:

FIGS. 10A to 10E show APS bytes for APS protocol processing, where 10A shows a general format and 10B show variations of APS byte in a switching node, FIG. 11 is an example of squelch table of node 1 in the preferred embodiment according to the invention, FIG. 12 is an example of squelch table of node 2 in the preferred embodiment according to the invention, FIG. 13 is an example of squelch table of node 3 in the preferred embodiment according to the invention, and FIG. 14 is an example of squelch table of node 4 in the preferred embodiment according to the invention.

DESCRIPTION OF THE PREFERRED EMBODIMENTS

Before explaining a synchronous ring network system in the preferred embodiment, the aforementioned conventional system will be explained in FIG. 1.

Figure 1:
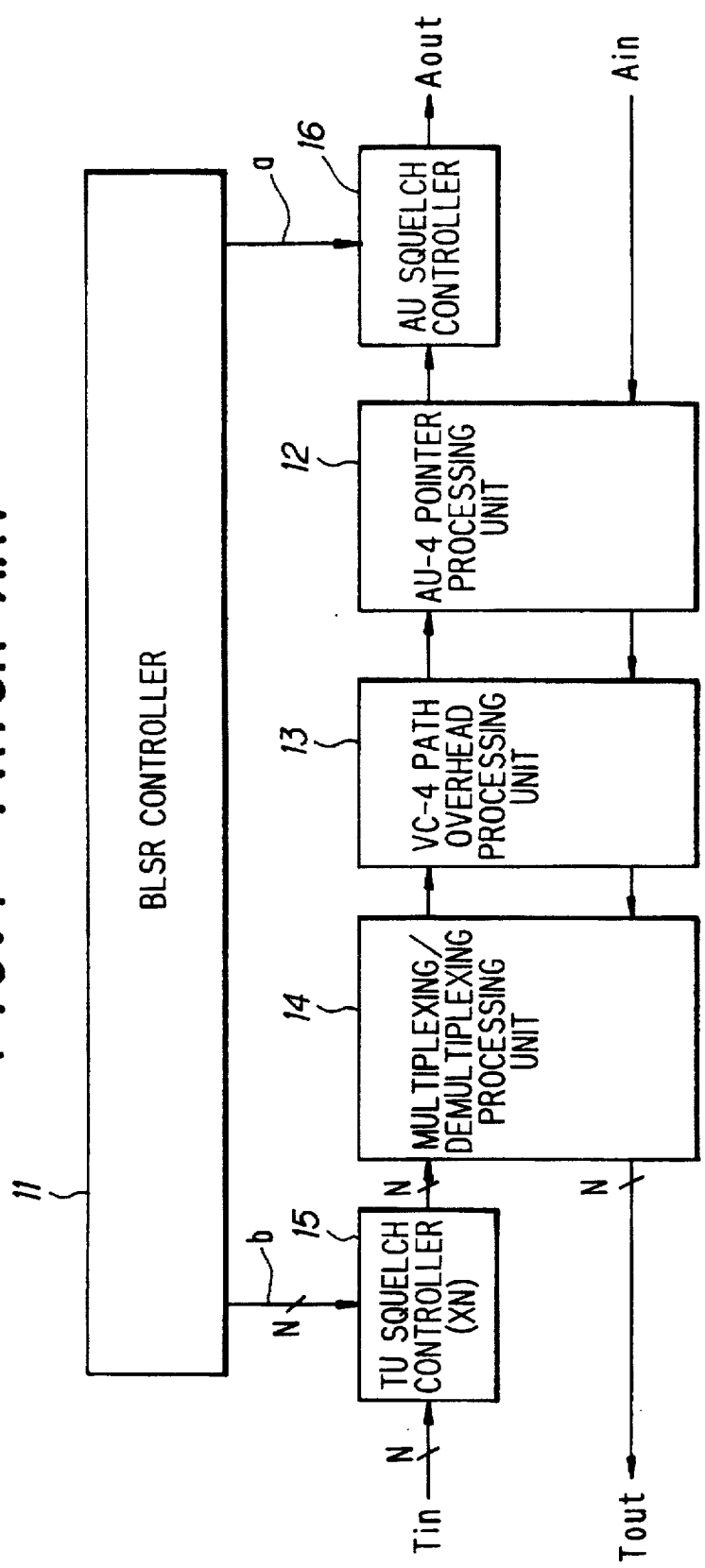
FIG. 1 is a block diagram showing a conventional system for preventing misconnection in a SDH device.

FIG. 1 shows a conventional system for preventing misconnection in the SDH(synchronous digital hierarchy) device. A transmission signal $T_{in}$ and a reception signal $T_{out}$ are lower-order TU(tributary unit) signals in BLSR (bidirectional line-switched ring) system. In a multiplexing/demultiplexing processing unit 14, the lower-order TU signals of number N(N is a positive integer) are multiplexed/demultiplexed according to multiplexing/demultiplexing rules for SDH.

Under European multiplexing/demultiplexing rules, the lower-order path is generally defined as VC-11,12,3,2 and a higher-order path is generally defined as VC-4, where VC means a "virtual container". Hereinafter, the higher-order path is referred to as "VC-4 path".

A VC-4 path overhead processing unit 13 conducts the production/termination of J1 byte, B3 byte, C2 byte, G1 byte, F2 byte, H4 byte, Z3 byte, Z4 byte and Z5 byte which are VC-4 path overhead bytes and also conducts a trouble detection and an action accompanied therewith in the receiving side.

An AU-4 pointer processing unit 12 conducts the production/interpretation of an AU-4 pointer and also conducts the detection of pointer trouble and an action accompanied therewith in the receiving side. Herein, the "AU-4" pointer stands for "Administrative Unit-4" pointer which points the top position of the VC-4. "An administrative unit" is a combination of a payload and an AU pointer in a SDH frame, which provides an adaptation between a higher-order path layer and a multiplex section layer.

A TU squelch controller 15 squelches a transmission TU signal $T_{in}$ of each lower-order path. The TU squelch control signal b from a BLSR controller 11 provides the controlling of squelch.

Here, "TU" stands for "Tributary Unit" which is a combination of a payload and a TU pointer, which provides an adaptation between a lower-order path layer and a higher-order path layer. Thus, hereinafter, the lower-order path is referred to as a TU path which comprises the payload section and the pointer section, and the higher-order path(VC-4) is referred to as an AU path(AU-4 path) which comprises the payload section and the pointer section.

An AU squelch controller 16 squelches a transmission AU signal $A_{out}$ of each higher-order path. The AU squelch control signal a from the BLSR controller 11 provides the controlling of squelch.

The BLSR controller 11 conducts APS(automatic protection switching) protocol processing of BLSR, protection switching control, searching for misconnection path caused by the protection switching, production of control signals a and b for AU squelch control and TU squelch control when a misconnection path is searched by the misconnection searching etc.

Meanwhile, the protection control of BLSR is in detail described in "Bellcore GR-1230-CORE" and "ITU-T Draft Recommendation G. SHR-1".

When the TU squelch controller 15 receives a TU squelch request by the TU squelch control signal b, it converts the transmission TU signal into a TU path AIS(alarm indication signal) signal to work TU squelch. Also, when the AU squelch controller 16 receives an AU squelch request by the AU squelch control signal a, it converts the transmission AU-4 signal into an AU-4 path AIS signal to work AU squelch.

Figure 2:
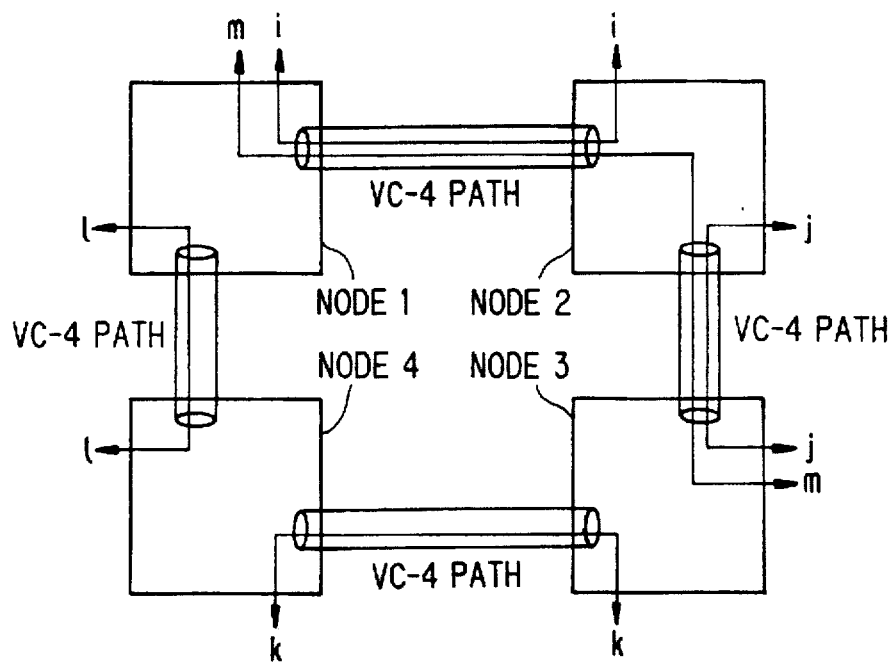
FIG. 2 is a block diagram showing an example of BLSR system.
Figure 3:
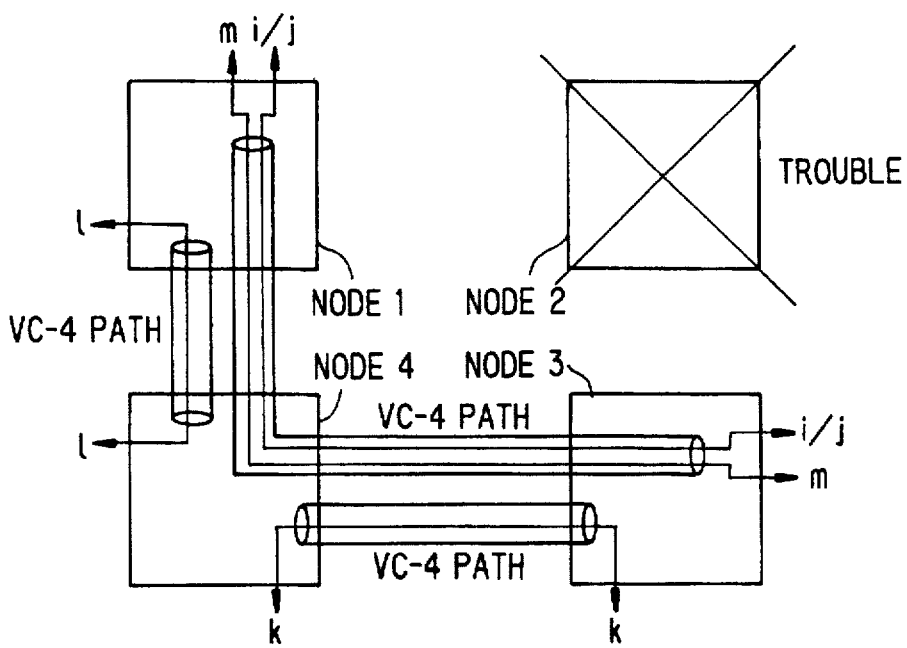
FIG. 3 is a block diagram illustrating misconnection by a node trouble occurred in the system in FIG. 2.

Referring to FIGS. 2 and 3, an example of misconnection caused by the protection switching of a BLSR system for carrying traffic through a lower-order path(hereinafter referred to as "TU access") will be explained. FIG. 2 shows a normal state and FIG. 3 shows a protection switching state.

In this example, TU path-i is laid on channel No.1 between node 1 and node 2, TU path-j is laid on channel No.1 between node 2 and node 3, TU path-l is laid on channel No.1 between node 4 and node 1, and TU path-m is laid on channel No.2 between node 1 and node 3 through node 2. Here, AUG(AU group number) including each TU path is common. VC-4 path overhead is terminated at each node.

FIG. 3 illustrates the case that node 2 is in trouble and nodes 1 and 3 are under protection switching. Here, nodes 1 and 3 are called switching nodes.

The TU path-m is saved by the protection switching, but the TU path-i and TU path-j are in misconnection due to the protection switching. The VC-4 path overhead to be terminated between nodes 1 and 2 and VC-4 path overhead to be terminated between nodes 2 and 3 have been terminated between nodes 1 and 3, which is the wrong termination state.

Figure 4:
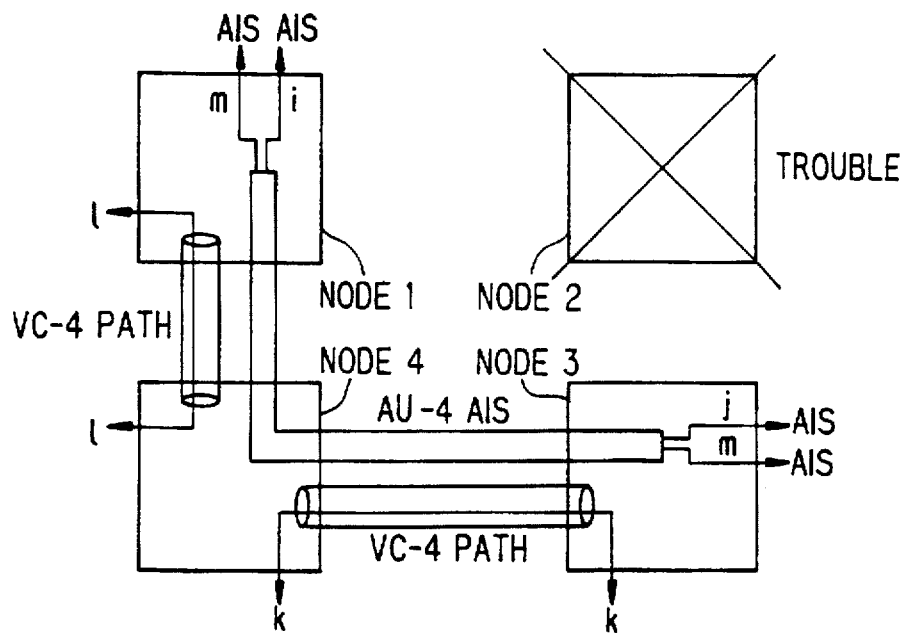
FIG. 4 is a block diagram illustrating an example of AU squelch control in the case of the misconnection as shown in FIG. 3.
Figure 5:
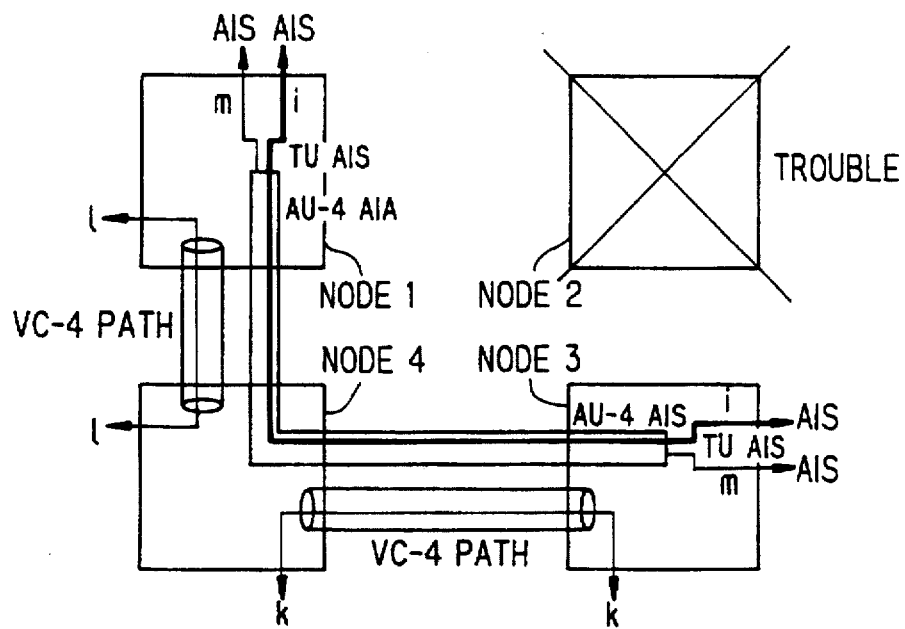
FIG. 5 is a block diagram illustrating an example of TU squelch control following the control as shown in FIG. 4.
Figure 6:
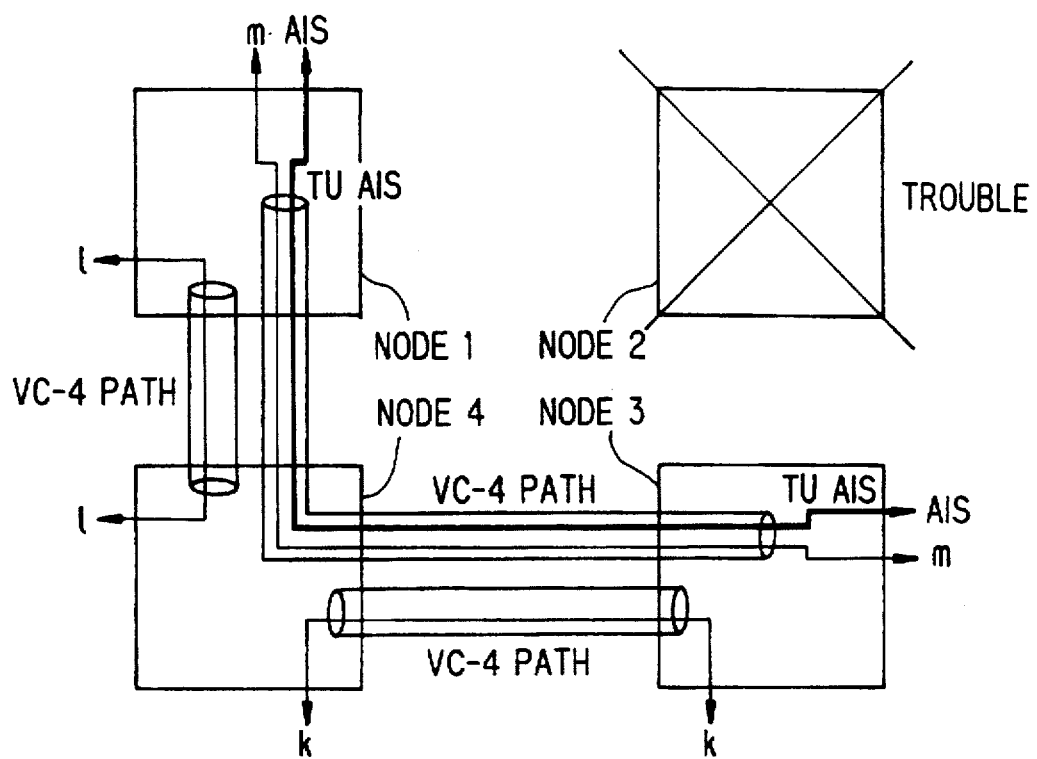
FIG. 6 is a block diagram illustrating an example of AU squelch release control following the control as shown in FIG. 5.

FIGS. 4 to 6 illustrate the squelch control method for preventing the misconnection in which the composition shown in FIG. 3 is exemplified. As mentioned above, the squelch control is conducted by the insertion of a path AIS signal. FIG. 4 shows a state that AU squelch control is conducted at the switching nodes 1 and 3. FIG. 5 shows a state that the AU squelch is conducted and TU squelch control is conducted at the termination nodes where a misconnected TU path is terminated. FIG. 6 shows a state that the AU squelch control is released and only the TU squelch control is conducted.

Here, the AU squelch control corresponds to the insertion of AU-4 path AIS signal to AUG including the misconnected TU path, and the TU squelch control corresponds to the insertion of TU path AIS signal to the misconnected TU path.

The squelch control is conducted such that the AU squelch which is simultaneously carried out with the protection switching at a switching node is carried out as the first step and the states shown in FIGS. 4, 5 and 6 are in turn transferred not to cause the transient misconnection. These three steps are carried out triggered by the change in contents of K1 and K2 bytes which are APS bytes used for APS protocol communication between nodes.

The detail functions of the VC-4 path overhead processing unit 13 and the AU-4 pointer processing unit 12 are described in "ITU-T Recommendation G.783".

Figure 7:
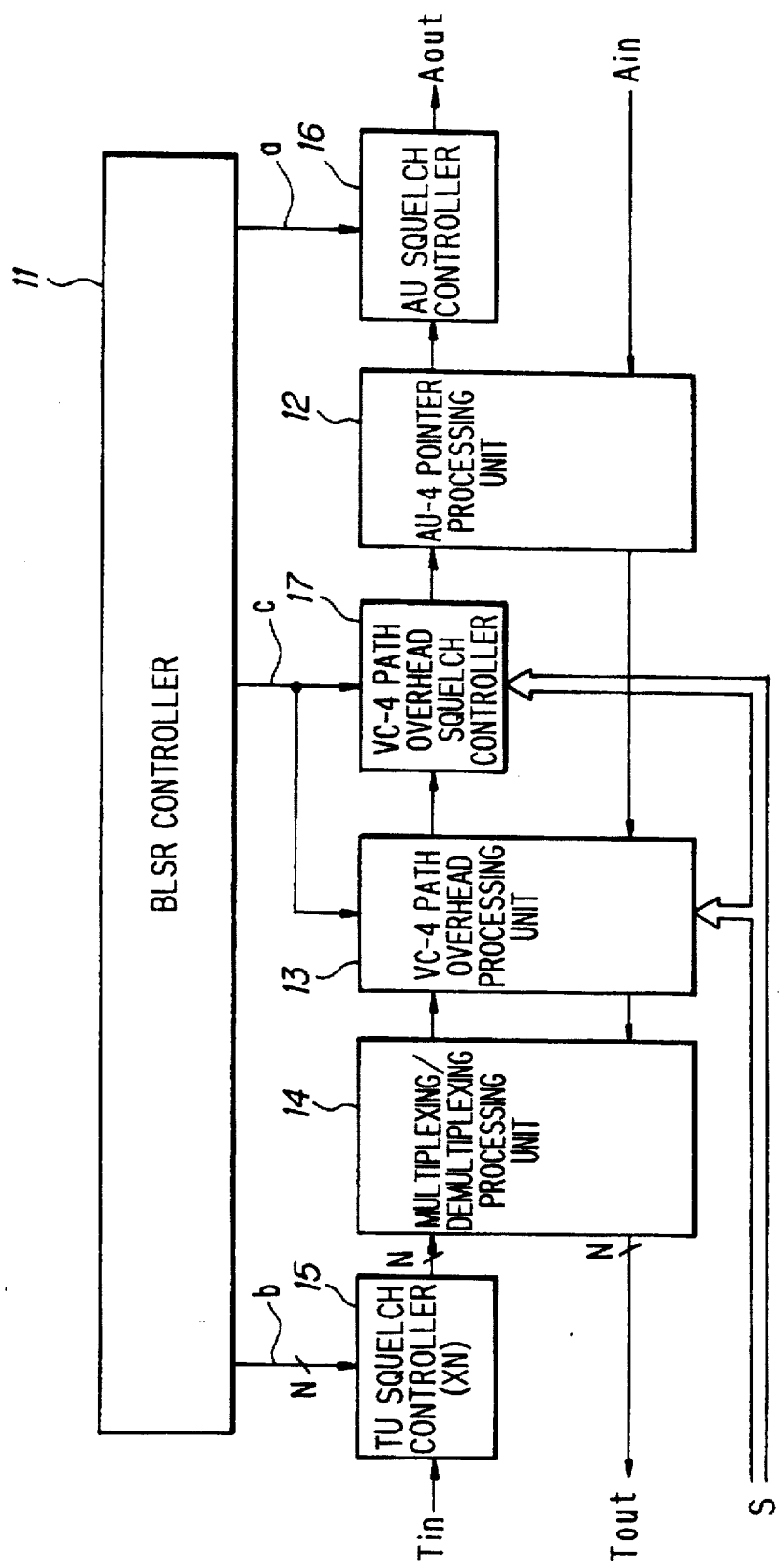
FIG. 7 is a block diagram showing a synchronous ring network system in a preferred embodiment according to the invention.

Next, a synchronous ring network system in the preferred embodiment will be explained in FIG. 7, wherein like parts are indicated by like reference numerals as used in FIG. 1.

In this embodiment, the case is explained where the functions of stopping the production of a misconnection avoiding object byte and sending a fixed value when a VC-4 path(higher order path) overhead is misconnected are apparently equal by squelching such that all the produced values in the object byte are "1".

The BLSR controller 11 conducts APS(automatic protection switching) protocol processing of BLSR, protection switching control and searching for a misconnection path, and it judges the misconnection of the VC-4 path overhead when the AU squelch is released and produces control signals a and b for AU squelch control and TU squelch control, respectively, when a misconnection path is searched and further produces a VC-4 path overhead squelch control signal c for the misconnection avoiding control of the VC-4 path overhead.

The multiplexing/demultiplexing processing unit 14 multiplxes/demultiplexes TU signals $T_{in}$, $T_{out}$ of number N(N is a positive integer) according to multiplexing/ demultiplexing rules for SDH.

The VC-4 path overhead processing unit 13 conducts the production/termination of J1 byte, B3 byte, C2 byte, G1 byte, F2 byte, H4 byte, Z3 byte, Z4 byte and Z5 byte which are VC-4 path overhead bytes and also conducts a trouble detection and an action accompanied therewith in the receiving side. Also, to the VC-4 path overhead byte which is previously set as a misconnection avoiding object by a VC-4 path overhead misconnection avoiding byte setting signal s, it stops the trouble detection and the action accompanied therewith in the receiving side when it receives the misconnection avoiding request through a VC-4 path overhead squelch control signal c from the BLSR controller 11.

Alternately, when it receives the misconnection avoiding request through the VC-4 path overhead squelch control signal c from the BLSR controller 11, the production of the misconnection avoiding byte may be stopped and a predetermined fixed value may be sent out. In this case, a VC-4 path overhead squelch controller 17, which will be explained below, is not necessary.

The AU-4 pointer processing unit 12 conducts the production/interpretation of an AU-4 pointer and also conducts the detection of pointer trouble and an action accompanied therewith in the receiving side.

When the TU squelch controller 15 receives a TU squelch request by the TU squelch control signal b, it converts the transmission TU signal into a TU path AIS(alarm indication signal) signal to work TU squelch. Also, when the AU squelch controller 16 receives an AU squelch request by the AU squelch control signal a, it converts the transmission AU-4 signal into a AU-4 path AIS signal to work AU squelch.

In the VC-4 path overhead squelch controller 17, when it receives the misconnection avoiding request through the VC-4 path overhead squelch control signal c from the BLSR controller 11, all the values inserted at the VC-4 path overhead processing unit 13 to the VC-4 path overhead byte which is previously set as a misconnection avoiding object by the VC-4 path overhead misconnection avoiding byte setting signal s are converted into "1".

Figure 8:
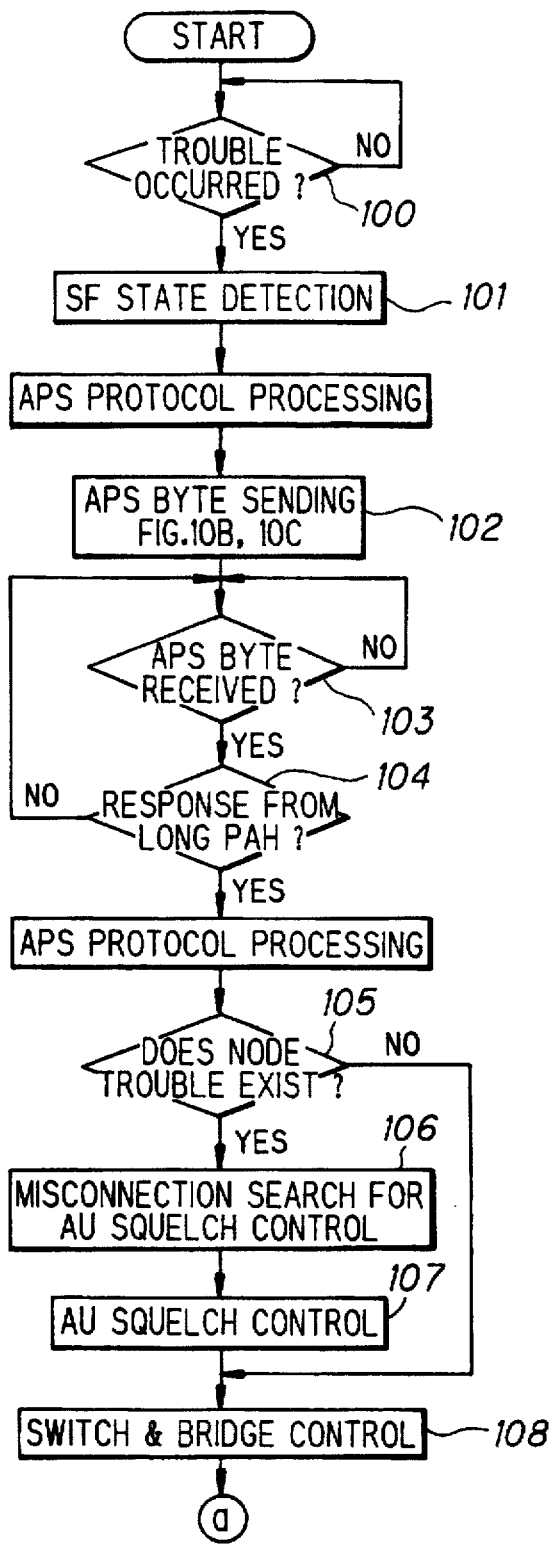
FIGS. 8 and 9 are flow charts showing an operation in the preferred embodiment according to the invention.
Figure 9:
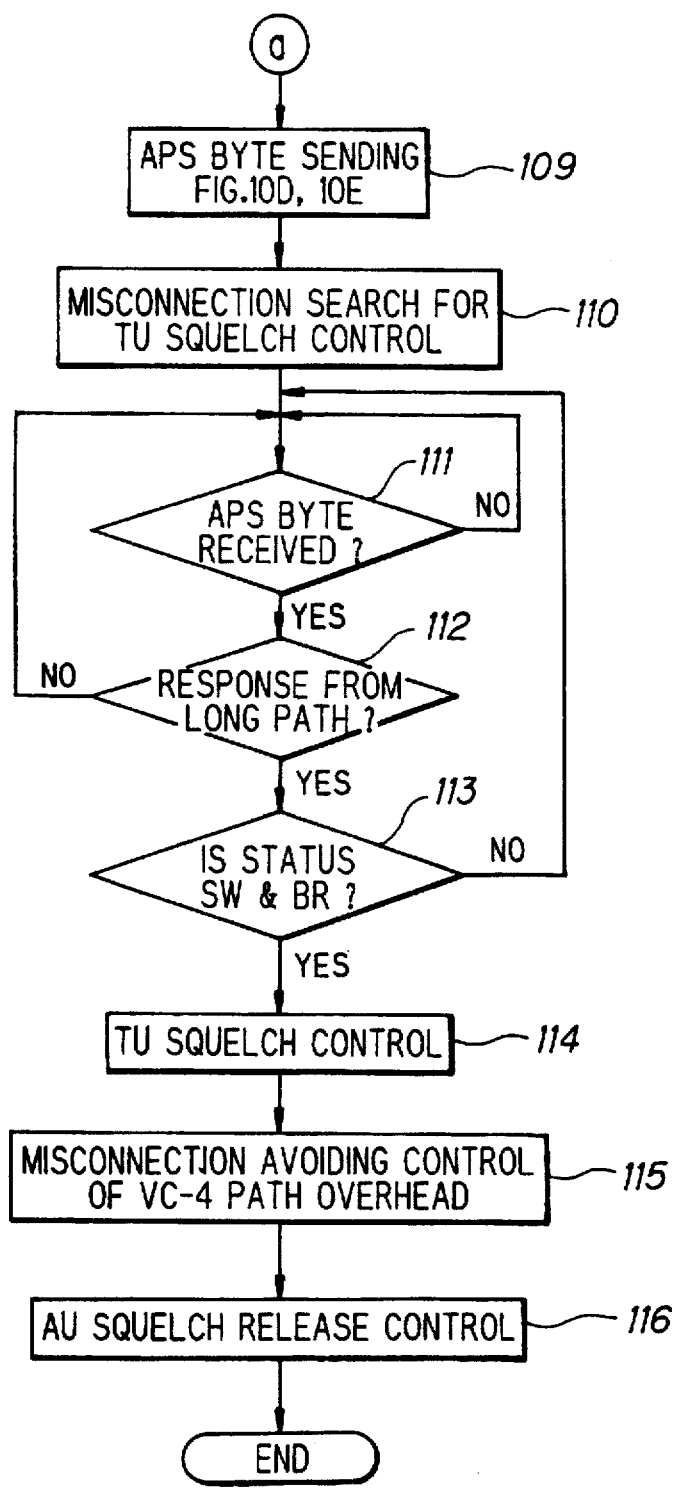

Next, with reference to FIGS. 8 and 9, the procedure of the squelch control will be explained. Though the conventional procedure of the squelch control for TU access comprises the three steps as shown in FIGS. 4, 5 and 6, the procedure of the invention includes an additional step for avoiding the VC-4 path overhead misconnection in the third step as shown in FIG. 6. Herein, the flow charts in FIGS. 8 and 9 show mainly switching nodes 1 and 3.

First, in the system as shown in FIG. 2, when the trouble occurs at node 2 (step 100), two nodes 1 and 3 adjacent to node 2 detect the SF (signal failure) state which is a ring switch request on the span to node 2 (step 101). As a result, nodes 1 and 3 send out an APS byte according to the APS protocol to node 2 (step 102). The APS byte sent from node 1 is shown in FIG. 10B, and the APS byte sent from node 3 is shown in FIG. 10C.

FIGS. 10A to 10E show APS bytes for the APS protocol processing, in which FIG. 10A illustrates contents thereof. As shown in FIG. 10A, the APS byte comprises K1 byte and K2 byte. The K1 byte comprises "BRIDGE REQUEST CODE" which means a request level and "DESTINATION NODE IDENTIFICATION" which means the number of a transmitted node. The K2 byte comprises "SOURCE NODE IDENTIFICATION" which means the number of a transmitting node, "L(long)/S(short)" which shows the distinction between a long path and a short path and "STATUS" which shows the state of switch and bridge. Herein, the long path means a path contrary side of the span where a switch request occurs, and the short path means a path on the span where a switch request occurs.

In FIGS. 10B and 10C, "BRIDGE REQUEST CODE" of both nodes 1 and 3 is "SF-R(signal failure-ring)" which shows the SF state requiring the ring switch.

In FIGS. 10B and 10C, "DESTINATION NODE IDENTIFICATION" of both nodes 1 and 3 is "2" since the trouble is detected on the side of node 2 and the APS byte is sent to node 2. In FIGS. 10B and 10C, "SOURCE NODE IDENTIFICATION" is "1" or "3" according to the transmitting node 1 or 3.

In FIGS. 10B and 10C, "STATUS" is "IDLE" which shows the state that neither switch nor bridge is employed since at this stage neither of them is employed. However, on the short path, "FERF (far end receive failure)" is overwritten which is an alarm transfer signal to the opposite station.

Next, since nodes 1 and 3 are sending the ring switch request, a response from the long path is waited(steps 103, 104). In this case, both nodes 1 and 3 expect to receive the response from node 2, but node 1 receives the ring switch request from node 3 and node 3 receives the ring switch request from node 1. As a result, the trouble in node 2 is recognized(step 105). From the recognition of the trouble in node 2, nodes 1 and 3 of switching nodes conduct a misconnection search for AU squelch control(step 106). With reference to FIGS. 11 to 14, the processing of the misconnection search will be explained below.

In each node 1 to 4, a squelch table which shows that each path is connected between a node and another node is previously set. From the squelch table and the trouble node number obtained from APS byte, which path is misconnected is decided.

FIGS. 11 to 14 are examples of the squelch tables which are previously set in nodes 1 to 4, which are applicable to the case of the BLSR system shown in FIG. 2. In the squelch table, to each AUG(AU group) number, information of an ADD node number, a DROP node number and whether a TU path is included is set on WEST(which is the side of a node adjacent to its node in the direction of CW) and EAST (which is the side of a node adjacent to its node in the direction of CCW) sides.

Here, the add node number means an ADD node number of a time slot signal with AUG number n of a signal input to WEST/EAST side. The DROP node number means an DROP node number of a time slot signal with AUG number n of a signal input to WEST/EAST side. Whether a TU path is included means whether a TU path is included in AUG number n, i.e., it shows whether or not a TU access exists. If the TU access exists, it means that the squelch table of TU level as shown to the right side in FIGS. 11 to 14 exists. The contents of the TU level squelch table are defined similarly as the above.

From the recognition of the trouble in node 2, the switching nodes 1 and 3 search whether or not the ADD/DROP node number includes "2" in the squelch tables(in FIGS. 11 and 13) of their own nodes. When the ADD/DROP node number includes "2", the time slot is dealt to be misconnected. Then AU squelch is conducted to the channel of AUG number 1 (step 107) and switch and bridge control is simultaneously conducted(step 108).

The state that the step 106 is completed is shown in FIG. 4. Then, the fact that the switch and bridge control is conducted is sent out by APS byte(step 109). Here, the APS byte sent out from node 1 is shown in FIG. 10D, and the APS byte sent out from node 2 is shown in FIG. 10E. The APS bytes in FIGS. 10D and 10E are produced such that only "IDLE" in FIGS. 10B and 10C is replaced by "BR & SW" which shows the state that bridge and switch control is conducted.

The above AU squelch is conducted by the AU squelch controller 16 through a control signal a from the BLSR controller 11 to insert the AU-4 path AIS signal.

Thereafter, each node conducts a misconnection search for TU squelch control(step 110). The misconnection search is conducted using the squelch tables shown in FIGS. 11 to 14. When a TU path is included in the channel of an AUG number in the squelch table, "2" is searched in the TU level squelch table. In this example, since the channel TU No. 1 of the switching nodes 1 and 3 includes "2", the misconnected TU path is decided to be laid on the channel TU No.1.

Next, nodes 1 and 3 wait a response from the long path(step 111, 112). Thereafter, by receiving a APS byte, the face that the status of the APS byte is changed from "IDLE" to "SW & BR" is confirmed(step 113) and TU squelch control is conducted(step 114). The TU squelch is conducted by the TU squelch controller 15 through the control signal b from the BLSR controller 11 to insert the TU path AIS signal.

Subsequently, the misconnection avoiding control of the VC-4 path overhead which is an object of AU squelch release is conducted(step 115) and AU squelch release control is then conducted(step 116). This is conducted such that the BLSR controller 11 of the SDH device which corresponds to the switching nodes 1 and 3 sends a misconnection avoiding request through the VC-4 path overhead squelch control signal c to the VC-4 path overhead squelch controller 17 and VC-4 path overhead processing unit 13 and simultaneously sends an AU squelch release request to the squelch controller 16.

In this case, a byte(a part of each byte of a VC-4 path overhead) which is previously designated by the VC-4 path overhead misconnection avoiding byte setting signal s becomes an object of the squelch. In the VC-4 path overhead processing unit 13, the production and termination of its byte are stopped while in the VC-4 path overhead squelch controller 17 the fixed value "1" is set to all contents of the byte.

Alternately, in the VC-4 path overhead processing unit 13, the production of the above byte may be stopped and a predetermined fixed value may be sent out therefrom. In this case, the VC-4 path overhead squelch controller 17 is not necessary.

Although the invention has been described with respect to a specific embodiment for complete and clear disclosure, the appended claims are not to be thus limited but are to be construed as embodying all modification and alternative constructions that may occur to one skilled in the art which fairly fall within the basic teaching set forth herein.

What is claimed is:

1. A synchronous ring network system comprising a plurality of nodes connected through a synchronous ring network, each of said plurality of nodes comprising multiplexing/demultiplexing means in which a TU signal which corresponds to a lower-order path signal is multiplexed to give an AU signal which corresponds to a higher-order path signal and said AU signal is demultiplexed to give said TU signal, higher-order path overhead processing means for conducting a production/termination control of a higher-order path overhead, lower-order path squelch means for squelching said TU signal, and higher-order path squelch means for squelching said AU signal, characterized in that each of said plurality of nodes further comprises:

switching means for conducting a protection switching processing in response to a trouble;

higher-order path misconnection search means for searching a misconnection of said AU signal caused by said switching processing;

means for instructing said higher-order path squelch means to squelch an AU signal from the result of said higher-order path misconnection searching;

lower-order path misconnection search means for searching a misconnection of said TU signal caused by said switching processing;

means for instructing said lower-order path squelch means to squelch a TU signal from the result of said lower-order path misconnection searching;

means for instructing the release of said higher-order path squelch after squelching by said lower-order path squelch means; and means for instructing said higher-order path overhead processing means to stop the termination as to a predetermined byte of each byte for composing said higher-order path overhead.

2. A synchronous ring network system, according to claim 1, further comprising:

means for instructing said higher-order path overhead processing means to stop the production as to said predetermined byte.

3. A synchronous ring network system, according to claim 2, further comprising:

means for setting a fixed value as to said predetermined byte.

4. A synchronous ring network system, according to claim 3, wherein:

said means for setting a fixed value inserts an alarm indication signal to said path overhead.

5. A synchronous ring network system, according to claim 3, wherein: an alarm indication signal is inserted to said path overhead by said means for setting a fixed value.

6. A synchronous ring network system, according to claim 3, wherein:

the setting of a fixed value as to said predetermined byte includes inserting an alarm indication signal to said path overhead.

* * * * *